United States Patent
Black (10) Patent No.: US 10,475,015 B2
(45) Date of Patent: Nov. 12, 2019

(54) TOKEN-BASED SECURITY PROCESSING

(71) Applicant: NCR Corporation, Duluth, GA (US)

(72) Inventor: Jonathan S. Black, Scotland (GB)

(73) Assignee: NCR Corporation, Atlanta, GA (US)

( * ) Notice: Subject to any disclaimer, the term of this patent is extended or adjusted under 35 U.S.C. 154(b) by 804 days.

(21) Appl. No.: 15/138,764

(22) Filed: Apr. 26, 2016

(65) Prior Publication Data

US 2017/0308883 A1 Oct. 26, 2017

(51) Int. Cl.
*G06Q 20/20* (2012.01)
*G06Q 20/32* (2012.01)
*G06Q 20/40* (2012.01)
*G06Q 20/38* (2012.01)

(52) U.S. Cl.
CPC ....... *G06Q 20/206* (2013.01); *G06Q 20/3278* (2013.01); *G06Q 20/385* (2013.01); *G06Q 20/4014* (2013.01)

(58) Field of Classification Search
CPC ............. G06Q 20/206; G06Q 20/3278; G06Q 20/385; G06Q 20/4014
See application file for complete search history.

(56) References Cited

U.S. PATENT DOCUMENTS

| | | | |
|---|---|---|---|
| 9,038,157 B1* | 5/2015 | Santiago, Jr. ............ | G06F 21/34 726/9 |
| 2015/0287019 A1* | 10/2015 | Barsalou ................ | G06Q 20/10 705/44 |
| 2017/0091765 A1* | 3/2017 | Lloyd .................... | G06Q 20/32 |

* cited by examiner

*Primary Examiner* — Seung H Lee
(74) *Attorney, Agent, or Firm* — Schwegman, Lundberg & Woessner (57) ABSTRACT

A user is authenticated for a session with a server, the server generates a unique session token valid during an active session with the server. Valid outstanding transactions for the active session are presented to the user. A selected outstanding transaction is provided to a Self-Service Terminal (SST) with the unique session token. The SST validates the unique session token and the selected outstanding transaction with the server. Upon confirmation from the server, the SST completes the selected outstanding transaction at the SST.

14 Claims, 5 Drawing Sheets

FIG. 4

TOKEN-BASED SECURITY PROCESSING

BACKGROUND

Consumers are embracing technology to perform a variety of transactions with enterprises. Mobile phones have allowed consumers to perform transactions on the go with enterprises, such transactions used to be reserved for desktop computers having largely wired connections to the Internet for accessing the retailer-based systems.

Some technology, in recent years, permits customers to pre-stage Automated Teller Machine (ATM) transactions, such that a customer can setup an ATM transaction, receive a transaction code, and later present the code at an ATM to dispense cash for completing the transaction. However, there are security and usability issues associated with such techniques.

For example, these approaches rely solely on a transaction number (which is not secure at all should that number be compromised) or these approaches also necessitate that a consumer enter a Personal Identification Number (PIN) as a second form of authentication (multifactor authentication) when combined with the transaction number (which hinders the usability and increases the time for consummating the transaction).

SUMMARY

In various embodiments, methods and a system for token-based security processing are provided.

According to an embodiment, a method for token-based security processing is provided. A session token is generated for an authenticated session with a mobile device. Next, the session token and a code for a pre-staged transaction associated with the authenticated session are provided to the mobile device. Finally, the session token and the code are authenticated for a Self-Service Terminal (SST) to complete processing for the pre-staged transaction as a completed transaction.

DETAILED DESCRIPTION

Figure 1A:
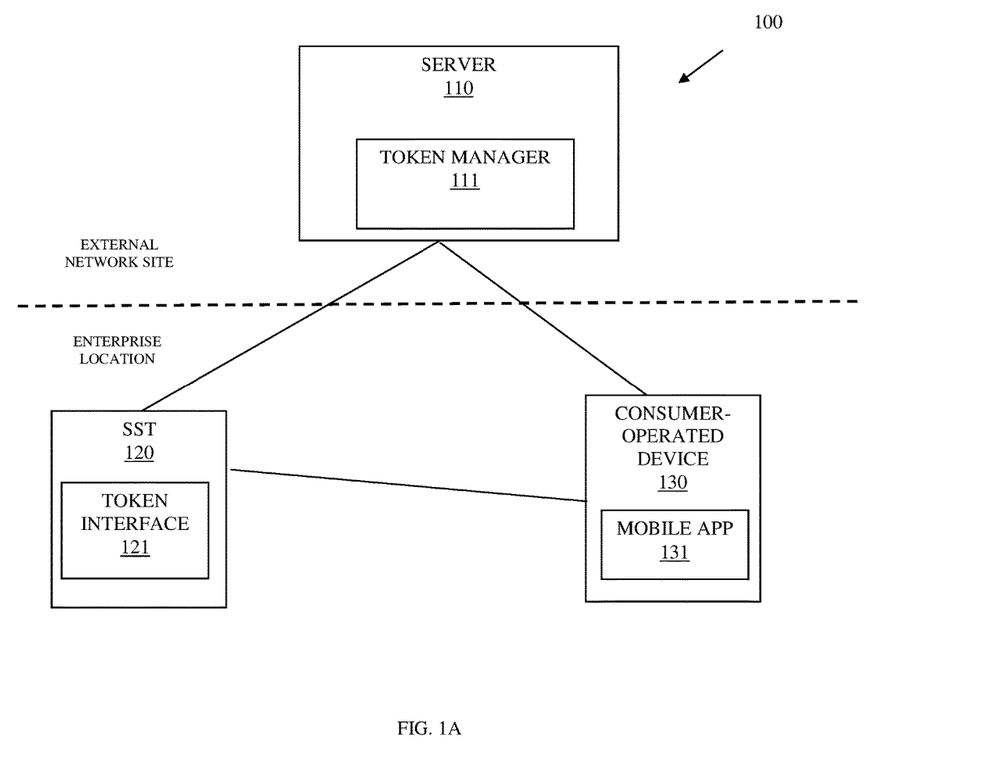
FIG. 1A is a diagram illustrating components of a token-based security processing system, according to an example embodiment.

FIG. 1A is a diagram illustrating components of a token-based security processing system 100, according to an example embodiment. It is to be noted that the token-based security processing system 100 is shown schematically in greatly simplified form, with only those components relevant to understanding of the embodiments being illustrated. Furthermore, the various components (that are identified in the FIG. 1A) are illustrated and the arrangement of the components is presented for purposes of illustration only. It is to be noted that other arrangements with more or less components are possible without departing from the teachings of token-based security processing, presented herein and below.

Furthermore, the techniques and the systems presented herein and below (for token-based security processing) may include all or some combination of the components shown with the system 100. The methods are programmed as executable instructions in memory and/or non-transitory computer-readable storage media and executed on one or more processors associated with the components/devices.

Specifically, the system 100 includes a server 110, a Self-Service Terminal (SST) 120, and a consumer-operated device 130. The server 110 includes a token manager 111. The SST 120 includes a token interface 121, and the consumer-operated device 130 includes a mobile application 131.

During operation of the system, a user operates the consumer-operated device 130 to access a user-facing interface for the mobile application 131. The mobile application 131 makes a connection with the server 110 (such as through WiFi or cellular networks), and the user-facing interface requests that the user log into the server 110 to establish a valid active electronic communication session between the consumer-operated device 130 and the server 110. The user enters a user-identifier and credentials into the user-facing interface of the mobile application 131. The token manager 111, authenticates the user and generates a unique active session identifier for the active communication session that identifies the user through a user-identity assigned to the user upon successful authentication with the token manager 131.

The user-facing interface of the mobile application 131 may then present a variety of user-selectable options to the user, such as, but not limited to, define a pre-staged transaction and recall existing incomplete pre-staged transactions.

When a user activates a defined pre-staged transaction, the user-facing interface presents input and selectable options for a user to define a transaction, such as define an Automated Teller Machine (ATM) withdrawal transaction. The user can select an account that the transaction is to be performed against, an amount associated with the transaction, as well as define whether it is the user or a different user that is authorized to perform the transaction. If a different user is selected, the user can define in the user-facing interface an identifier for that different user, such as an email address, a phone number, etc. The user may also define conditions for the pre-staged transaction, such as based on a predefined geofenced area (can be based on zip code, city, state, etc.). The user may also define conditions for requiring additional security, such as a user-defined code, a randomly generated code, an answer to a user-defined question, etc. In addition, the user can define expiry conditions for when the pre-staged transaction is no longer valid for processing based on: elapsed time from the creation of the pre-staged transaction, a specific calendar date, a specific time of a specific calendar date, a specific time of day for the day that the pre-staged transaction was created, and others. In some case, the expiry conditions can be set as pre-defined system defaults.

When the user selects the recall pre-staged incomplete transactions from the user-facing interface. The token manager 111 uses the user-identity to obtain a listing of all maintained non-expired pre-staged transactions previously defined by (created by, owned by, or designated to) the user and maintained on the server 110 by the token manager 111. The listing (may include zero, one, or more than one pre-staged and incomplete transaction) is pushed from the token manager 111 to the mobile application 131 for presentation by the consumer-operated device 130 within the user-facing interface of the mobile application 131. At this point, the user may edit a selected pre-staged transaction, assuming the user owns or created the pre-staged transaction being edited and it is not a pre-staged transaction that the user was designated for performance of (activating a similar set of interface options as what was presented when the user created that selected pre-staged transaction) for purposes of modifying conditions previously defined by the user or for purposes of deleting the selected pre-staged transaction (making it no longer valid for processing)).

When the user selects a non-expired pre-staged transaction for completion from the listing within the user-facing interface of the mobile application 131, a variety of novel processing can occur. For example, the user-facing interface may present the user with a Quick Response (QR) code (which can be generated by either the token manager 111 or the mobile application 131), which includes an encoded version of the unique session token and a transaction number for the selected pre-staged transaction. In another case, the unique session token and the transaction number for the selected pre-staged transaction are encode as information within a Near Field Communication (NFC) card accessible to the consumer-operated device 130 (generated by the token manager 111 or the mobile application 131). In still another case, the unique session token and the transaction number are presented in text format for viewing by the user through the user-facing interface of the consumer-operated device 130.

The QR code, NFC card, and/or text data representing the unique session token and the selected pre-staged transaction can then be communicated from the consumer-operated device 130 to the token interface 121 of the SST 120 in a variety of manners.

The token interface is a new and novel interface accessible on the SST 120, which receives the combination of the unique session token and selected pre-staged transaction number either through input made by the user while operating a user-facing interface of the token interface 121 (in the case where the unique session token and the selected pre-staged transaction are provided by the user as text data). The user may also display the QR code representing the unique session token and selected pre-staged transaction on a display of the consumer-operated device and present the displayed QR code to a scanner or camera of the SST 120. Still further, the user may tap the consumer-operated device 130 at a pre-defined location identified on the SST 120 to transfer the NFC card to an NFC reader integrated into the SST 120.

Once the unique session token and selected pre-staged transaction number are communicated to the SST 120 or a peripheral of the SST 120 (scanner or NFC reader), the token interface 120 connects over a network connection with the server 110 for obtaining validation from the token manager 111. Accordingly, the token interface communicates the unique session token and the selected pre-staged transaction number to the token manager 111 during the network connection between the SST 120 and the server 110. The token manager 111 checks to see if the user, identified from the transaction token, still has the active session associated with the unique session token. That is, the user has not terminated the session or that the session has not terminated abnormally due to loss of connection, power, or software failure associated with the consumer-operated device 130. If the active session is no longer active (not in progress), then the token manager 111 provides a notice to the token interface that the transaction request is to be denied by the SST 120. Assuming the unique session token is associated with an active session of the user with the server 110, then the token manager obtains transaction details associated with the selected pre-staged transaction and any user-defined conditions. By checking that an active session is in progress with an authenticated customer, the token manager 111 can ensure that bogus or attempted versions of a session token are detected and not authenticated.

Any conditions associated with the pre-staged transaction can be entirely evaluated by the token manager 111, entirely evaluated by the token interface 121, or partially evaluated by both the token manager 111 and the token interface. For example, if expiry conditions are based on time or location (geofence), the token manager 111 may evaluate these entirely independent of the token interface 121. The SST 120 may include an identifier that the token manager 111 maintains with a specific geographical location and the calendar date and time of day that the token manager 111 receives the unique session token and pre-staged transaction number from the token interface 121 is obtainable by a system clock accessible on the server 120 or may be included in the communication packets between the token interface 121 and the token manager 111. Geofence information may also be obtained as a mobile location from consumer-operated device 130 during the active session by the token manager 111 and compared against an SST location for the SST 120 (either transmitted by the SST 120 or known for the SST 120) In another case, the pre-staged transaction may include additional conditions beyond the expiry conditions, such as a user-defined code, which the token manager 111 communicates to the token interface 121 and requests that the token interface 121 present a user-facing input field to the user for the user to enter the user-defined code. Once done, the token interface 121 can independently evaluate whether that entered user code matches the user-defined code for validation purposes and if so can communicate session back to the token manager 111. In another situation, the code or answer to a question may be the only user-defined condition, which the token interface 121 can resolve once supplied the code or answer to the question through user-facing interaction with the user.

When the token manager 111 is assured that all conditions (expiry and/or user-defined) have been successfully validated for processing the pre-staged transaction, the token manager 111 sends the instructions to the SST 120 for consummating and completing the pre-staged transaction on the SST 120 for the user. So, the token manager 111 may debit an account of a user (in one example) by an amount identified in the pre-staged transaction and send a dispense command with the amount to the SST 120. The SST 120 then passes the command and amount to a dispenser of the SST 120, dispenses the amount to the user, and reports completed back to the token manager 111. The pre-staged transaction is now completed and accounted for at the SST 120 and at the server 110 and the user has the amount of cash associated with the transaction. In another case, the token manager 120 builds a transaction object that the SST 120 is capable of processing through a financial or retail network for dispensing cash from the SST and appropriately debiting or crediting a consumer's account with the financial or retail back end systems. In this case, the token manager 111 received notification from the SST 120 when such backend completion and SST dispensing processing completes so that the token manager 111 can flag the associated pre-staged transaction as being completed or redeemed at the server 100.

It is to be noted that this is but one example of processing for the system 100, other situations are discussed herein and below.

Further, it is to be noted, that the user that creates the pre-staged transaction does not have to be in all cases the user that consummates the pre-staged transaction at the SST 120. So, assuming a first user creates a pre-staged transaction (in the manners discussed above) and identifies a condition as a second user, when the second user logs in through mobile application 131 to the server 110 and has an active session, the pre-staged transaction created by the first user is shown as available to the second user during that second user's active session. This is a convenient and novel mechanism for a first user to provide limited and first user-defined access to that first user's account for a specific one-time transaction accessible to a second user (different from the first user and having no authority to access the account except for a very specific transaction assuming all first user-defined conditions are met). The second user may not even have any account associated with the financial institution of the first user even though the second user is provided limited one-time access through consummation of the pre-staged transaction at the SST 120.

In an embodiment, electronic communications between the SST 120 and the server 110 are encrypted. In an embodiment, any electronic communication (such as the NFC card transfer) between the SST 120 and the consumer-operated device 130 are encrypted. In an embodiment, any electronic communication between the consumer-operated device 130 and the server 110 are encrypted.

In an embodiment, when the user defines a pre-staged transaction for processing by a different user, the mobile application 131 and/or the token manager 111 sends a Short Messaging Service (SMS) text message with a link. The link when activated can present a registration page for the different user to download an instance of the mobile application 131 to a consumer-operated device 130 and registering the different user for an account with the server 110 (such that the different user can establish the required active session and unique session token from the token manager 111 for performing the pre-staged transaction).

In an embodiment, during an active session between the consumer-operated device 130 and the server, the listing of available pre-staged transactions associated with the authenticated user of the active session can be dynamically refreshed by the token manager 111 and pushed for presentation by the token manager 111 to the mobile application 131. In this way, some pre-staged transactions may no longer be available for selection by the user during the active session and/or new pre-staged transactions may dynamically appear for selection by the user during the active session.

The token manager 111 ensures that a user must have an active session with the server 110 and the token manager 111 ensures that only those pre-staged transactions that have an identifier for the user are available for the user to process on the SST 120.

In an embodiment, when the user defines a pre-staged transaction for processing by a different user and where the different user has an account with the server 110, the token manager 111 sends a message to the mobile application 131 on the consumer-operated device 130 of the different user for presentation as a notification that the different user has a pre-staged application setup by the user that is available for completion by the different user during a valid active session by the different user with the server 110.

In an embodiment, the consumer-operated device 130 is one of: a mobile phone, a laptop, a tablet, and a wearable processing device.

Figure 1B:
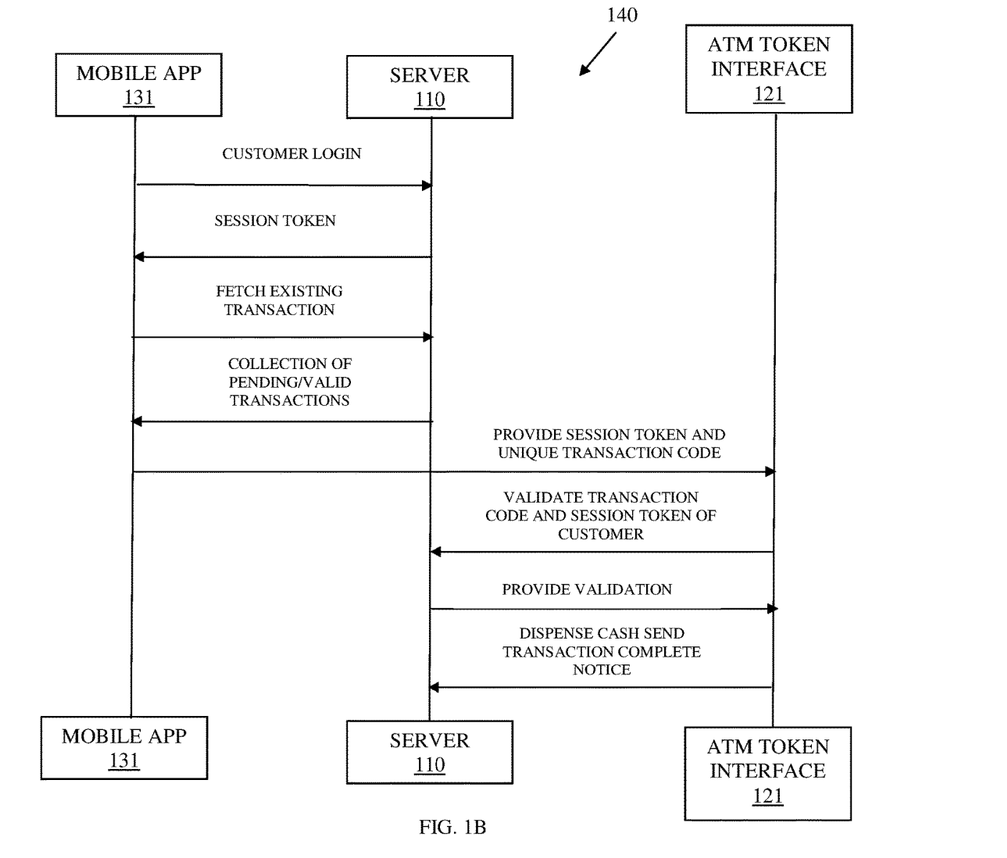
FIG. 1B is a diagram of a method for the token-based security processing system of the FIG. 1, according to an example embodiment.

FIG. 1B is a diagram of a method 140 for the token-based security processing system of the FIG. 1, according to an example embodiment.

The method 140 is discussed within an example operational scenario of the system 100, where the SST 120 is an ATM, the token interface 121 is an ATM token interface, and the server is a backend system of a financial institution. It is to be noted that other scenarios can be practiced with the system 100 as well without departing from the beneficial teachings presented herein.

Moreover, the example operational scenario is for a pre-staged ATM withdrawal transaction that was either defined by a user having an account with the financial institution for use by that user or defined by the user for a different user to access and process where that different user may or may not have a different account with that financial institution (in other words whether or not the different user has an account or does not have an account with the financial institution is irrelevant). However, the different user at least has a registration for accessing the token manager 111 of server 110 for an active session with the server 110.

The user operates the mobile application 131 on the user's consumer-operated device 130 to login and authenticate with the server 110 for an active session with the server 110 (between the consumer-operated device 130 and the server 110 so that the mobile application 131 and the token manager 111 can communicate with one another).

The token manager 111 of the server 110 generates a unique active session token for the now active communication session. This unique session token is stored and maintained by the server 110 for as long as the communication session remains active (in other words does not terminate abnormally or normally (based on some action of the user)). The unique session token is also stored and maintained on the server 110 with a link to or an association with the authenticated customer identity for the user that logged in for the active communication session.

The session token is communicated from the token manager 111 of the server 110 to the mobile application 131. Through actions of the user when interacting with the mobile application 131 or by automated request by the mobile application 131 a request is made using the session token from the mobile application 131, in response, the token manager 111 of the server 110 obtains all pending (pre-staged) transactions associated with the user and returns them as a collection of selectable transactions back to the mobile application.

Next, the user provides the session token and selected transaction code to the ATM token interface 121 of the ATM 120. Provided through QR scanning, NFC tapping, and/or through entry through a user-facing interface of the ATM token interface 121 of the ATM 120.

The ATM token interface 121 of the ATM 120 then sends over a separate network connection the session token and transaction code to the server 110. The token manager 111 of the server 110 locates the transaction using the transaction code and identifies whether or not such transaction can be processed by the user by matching a user identifier for the user of the active session to a user identifier in the proposed transaction. The token manager 111 also validates the user has an active valid session with the server 110 as identified by the session token. Assuming both the transaction code (having the user identifier) and session token (the session for the session token is still active and alive) are validated, the token manager 111 sends instructions to the ATM 110 to dispense cash in an amount associated with the transaction. In an embodiment, the token manager 111 sends the instruction as a transaction object that the ATM 110 recognizes and can process through a financial switch network with an appropriate backend financial system.

The ATM 120 then dispenses the amount of currency to the user and sends a completed transaction back to the server 110. The server 110 then updates a status for the previous pre-staged and pending transaction to a completed status, such that the transaction will not be validated for processing a second time because the token manager 120 will see the completed status and invalidate the authorization request when received from the ATM 120.

These and other embodiments are now discussed with reference to the FIGS. 2-4.

Figure 2:
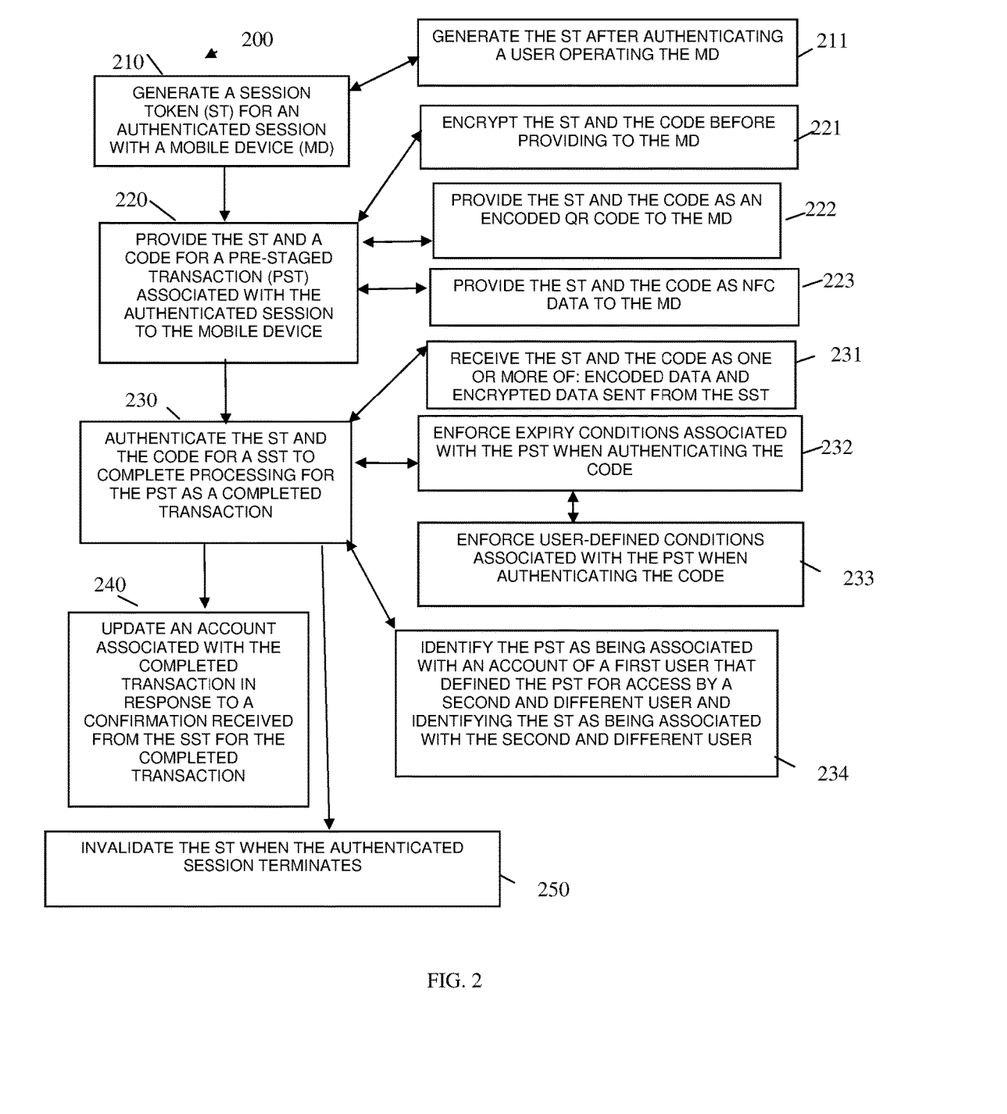
FIG. 2 is a diagram of a method for token-based security processing, according to an example embodiment.

FIG. 2 is a diagram of a method 200 for token-based security processing, according to an example embodiment. The software module(s) that implements the method 200 is referred to as a "token manager." The token manager is implemented as executable instructions programmed and residing within memory and/or a non-transitory computer-readable (processor-readable) storage medium and executed by one or more processors of a device. The processor(s) of the device that executes the token manager are specifically configured and programmed to process the token manager. The token manager has access to a network during its processing. The network can be wired, wireless, or a combination of wired and wireless.

In an embodiment, the device that executes the token manager is a cloud processing environment.

In an embodiment, the device that executes the token manager is the server 110 of the FIG. 1A.

In an embodiment, the device that executes the token manager is a backend core banking server of a financial institution.

In an embodiment, the device that executes the token manager is a server that interacts with one or more backend core banking services of one or more different financial institutions.

In an embodiment, the token manager is the token manager 111 of the FIG. 1A.

At 210, the token manager generates a session token for an authenticated session with a mobile device (such as the consumer-operated device 130).

In an embodiment, at 211, the token manager generates the session token after authenticating a user operating the mobile device. That is, the user provides a user identifier and credentials (such as a password or fingerprint) through an interface (such as the user-facing interface of the mobile application 131) of the mobile device.

At 220, the token manager provides the session token and a code for a previously pre-staged transaction that is associated with the authenticated session.

In an embodiment, at 221, the token manager encrypts the session token and the code before providing the session token and the code to the mobile device. In an embodiment, this is done using Public-Private Key encryption utilizing a public key for the mobile device and a private key of the server that executes the token manager. Other encryption can be used as well.

In an embodiment, at 222, the token manager provides the session token and the code as an encoded QR code to the mobile device.

In an embodiment, at 223, the token manager provides the session token and the code as NFC data to the mobile device.

At 230, the token manager authenticates the session token and the code for a SST to complete processing for the pre-staged transaction as a completed transaction.

In an embodiment, at 231, the token manager receives the session token and the codes as one or more of: encoded data and encrypted data sent from the SST.

In an embodiment, at 232, the token manager enforces expiry conditions associated with the pre-staged transaction when authenticating the code.

In an embodiment of 232 and at 233, the token manager enforces user-defined conditions associated with the pre-staged transaction when authenticating the code.

In an embodiment, at 234, the token manager identifies the pre-staged transaction as being associated with an account of a first user that defined the pre-staged transaction for access by a second and different user and identifying the session token as being associated with the second and different user.

According to an embodiment, at 240, the token manager updates an account associated with the completed transaction in response to a confirmation received from the SST indicated that the pre-staged transaction was completed as the completed transaction.

In an embodiment, at 250, the token manager invalidates the session token when the authenticated session terminates. That is, the token manager will not authenticate the session token once the session associated with the session token terminates (normally or abnormally).

Figure 3:
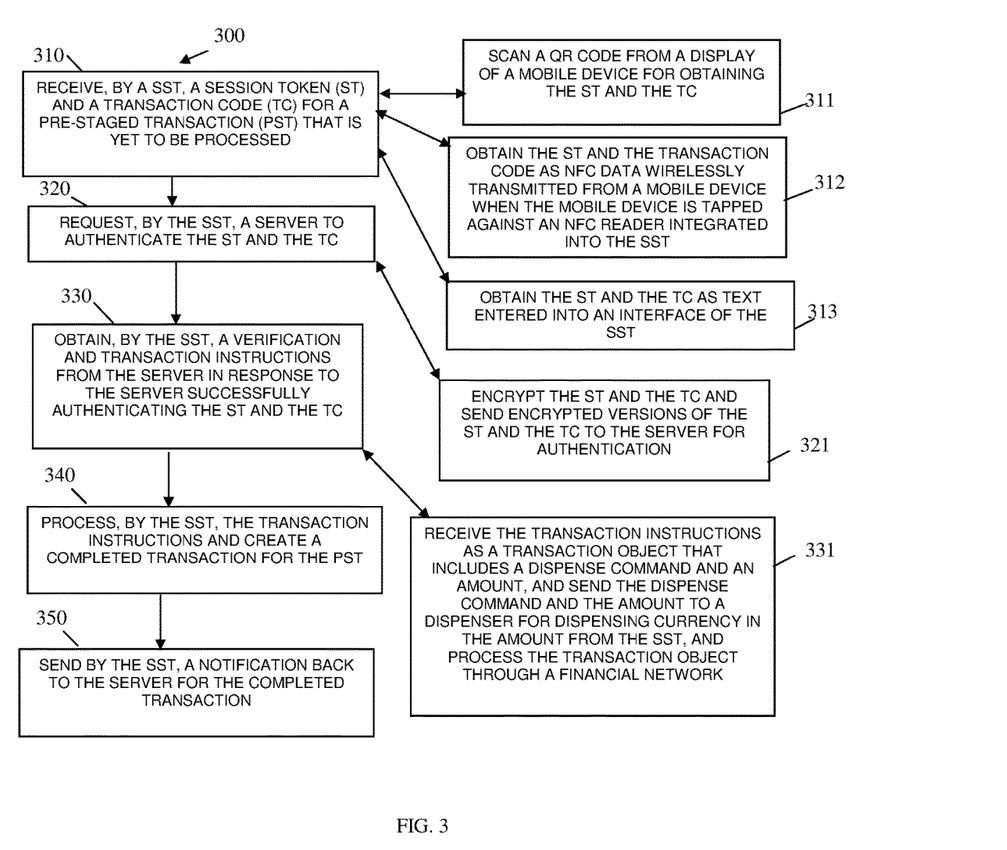
FIG. 3 is a diagram of another method for token-based security processing, according to an example embodiment.

FIG. 3 is a diagram of another method 300 for token-based security processing, according to an example embodiment. The software module(s) that implements the method 300 is referred to as an "SST token interface." The SST token interface is implemented as executable instructions programmed and residing within memory and/or a non-transitory computer-readable (processor-readable) storage medium and executed by one or more processors of a hardware device. The hardware processors that execute the SST token interface are specifically configured and programmed to process the SST token interface. The SST token interface has access to one or more networks during its processing. Each network can be wired, wireless, or a combination of wired and wireless.

In an embodiment, the SST token interface is the token interface manager 111 of the FIG. 1A.

In an embodiment the device that executes the SST token interface is an SST. In an embodiment, the SST is an ATM. In an embodiment, the SST is a Point-Of-Sale (POS) terminal. In an embodiment, the SST is a kiosk.

At 310, the SST token interface receives a session token and a transaction code for a pre-staged transaction that is yet to be processed.

According to an embodiment, at 311, the SST token interface scans a QR code from a display of a mobile device for obtaining the session token and the transaction code.

In another instance, at 312, the SST token interface obtains the session token and the transaction code as NFC data wirelessly transmitted from a mobile device when the mobile device is tapped against an NFC reader integrated into the SST.

In another situation, at 313, the SST token interface obtains the session token and the transaction code as text entered into an interface screen presented on the SST.

At 320, the SST token interface requests a server (such as server 110) to authenticate the session token and the transaction code.

According to an embodiment, at 321, the SST token interface encrypts the session token and the transaction code and sends encrypted versions of the session token and the transaction code to the server for authentication.

At 330, the SST token interface obtains a verification and transaction instructions from the server in response to the server successfully authenticating the session token and the transaction code.

In an embodiment, at 331, the SST token interface receives the transaction instructions as a transaction object including a dispense command and an amount. The SST token interface then sends the dispense command and amount to a dispenser (integrated into the SST) for dispensing currency in the amount from the SST. The SST token interface also processes other portions of the transaction object through an appropriate financial network to properly debit an account of a user from which the debit occurred and to properly note the executed and completed transaction (it is noted that account debited may be for a user that is different from the user performing the transaction at the SST (this was discussed at length above)).

At 340, the SST token interface processes the transaction instructions and creates a completed transaction for the pre-staged transaction.

According to an embodiment, at 350, the SST token interface sends a notification back to the server for the completed transaction and further processing by the server to indicate the pre-staged transaction has been completed.

Figure 4:
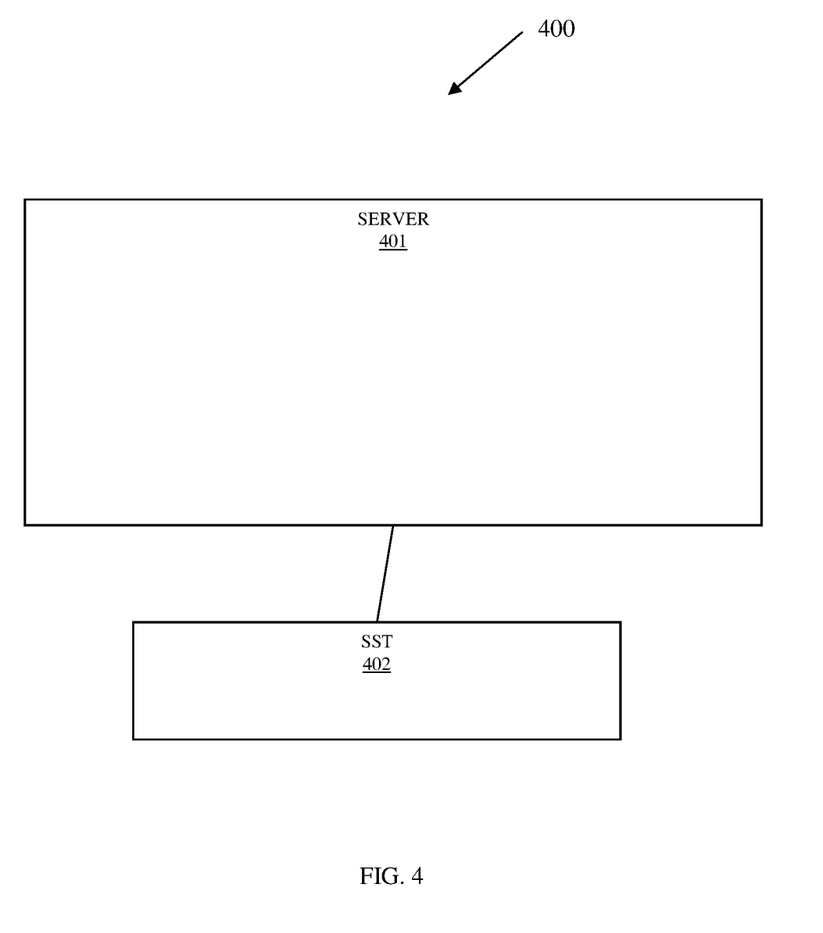
FIG. 4 is a diagram of another token-based security processing system, according to an example embodiment.

FIG. 4 is a diagram of another token-based security processing system 400, according to an example embodiment. Some components of the token-based security processing system 400 are programmed and reside within memory and/or a non-transitory computer-readable medium and execute on one or more hardware processors of the token-based security processing system 400. The token-based security processing system 400 communicates over one or more networks, which can be wired, wireless, or a combination of wired and wireless.

In an embodiment, the token-based security processing system 400 is the system 100 of the FIG. 1A.

In an embodiment, token-based security processing system 400 implements, among other things, the processing discussed in the FIGS. 1A, 1B, and 2-3.

The token-based security processing system 400 includes a hardware server 401, and integration SST 402.

The server 401 includes one or more processors and executable instructions processed by the one or more processors and configured to: define a pre-staged transaction for a user (as defined by the user), generate a session token, link the session token to a transaction code associated with the pre-staged transaction, and authenticate the session token and the transaction code.

In an embodiment, the server 401 is the server 110.

In an embodiment, the executable instructions of the server 401 are the instructions represented by the processing discussed above with respect to the token manager 111.

In an embodiment, the executable instructions of the server 401 are the instruction represented by the processing of the method 200 of the FIG. 2.

The SST 402 includes one or more processors, peripheral devices (scanner, dispenser, receipt printer, etc.), and executable instructions processing by the one or more processors and configured to: request authentication of the session token and the transaction code from the server 401 and process transaction instructions for the pre-staged transaction as received from the server 401 and in response to successful authentication, by the server 401, of the session token and the transaction code.

In an embodiment, the SST 402 is the SST 120. In an embodiment, the SST 402 is an ATM. In an embodiment, the SST 402 is a POS terminal. In an embodiment, the SST 402 is a kiosk.

In an embodiment, the executable instructions of the SST are the instructions represented by the processing of the method 300 of the FIG. 3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   generating a session token for an authenticated session with a mobile device;
   providing the session token and a code for a pre-staged transaction associated with the authenticated session to the mobile device; and
   authenticating the session token and the code for a Self-Service Terminal (SST) to complete processing for the pre-staged transaction as a completed transaction, wherein authenticating further includes identifying the pre-staged transaction as being associated with an account of a first user that defined the pre-staged transaction for access by a second and different user and identifying the session token as being associated with the second and different user.

2. The method of claim 1 further comprising, updating the account associated with the completed transaction in response to a confirmation received from the SST for the completed transaction.

3. The method of claim 1 further comprising, invalidating the session token when the authenticated session terminates.

4. The method of claim 1, wherein generating further includes generating the session token after authenticating a user operating the mobile device.

5. The method of claim 1, wherein providing further includes encrypting the session token and the code before providing to the mobile device.

6. The method of claim 1, wherein providing further includes providing the session token and the code as an encoded Quick Response (OR) code to the mobile device.

7. The method of claim 1, wherein providing further includes providing the session token and the code as Near Field Communication (NFC) data to the mobile device.

8. The method of claim 1, wherein authenticating further includes receiving the session token and the code as one or more of: encoded data and encrypted data sent from the SST.

9. The method of claim 1, wherein authenticating further includes enforcing expiry conditions associated with the pre-staged transaction when authenticating the code.

10. The method of claim 9, wherein authenticating further includes enforcing user-defined conditions associated with the pre-staged transaction when authenticating the code.

11. A method, comprising:
receiving, by a Self-Service Terminal (SST), a session token and a transaction code for a pre-staged transaction that is yet to be processed, wherein receiving further includes obtaining the session token and the transaction code as text entered into an interface of the SST;
requesting, by the SST, a server to authenticate the session token and the transaction code;
obtaining, by the SST, a verification and transaction instructions from the server in response to the server successfully authenticating the session token and the transaction code; and
processing, by the SST, the transaction instructions and creating a completed transaction for the pre-staged transaction.

12. The method of claim 11 further comprising, sending, by the SST, a notification back to the server for the completed transaction.

13. The method of claim 11, wherein requesting further includes encrypting the session token and the transaction code and sending encrypted versions of the session token and the transaction code to the server for authentication.

14. The method of claim 11, wherein obtaining further includes receiving the transaction instructions as transaction object including a dispense command and an amount, and sending the dispense command and the amount to a dispenser for dispensing currency in the amount from the SST, and processing the transaction object through a financial network.

* * * * *